April 18, 1967  A. SCHNEIDER  3,314,407
ELECTRONIC ADVANCE FOR ENGINE IGNITION SYSTEMS
Filed Sept. 28, 1964  3 Sheets-Sheet 1
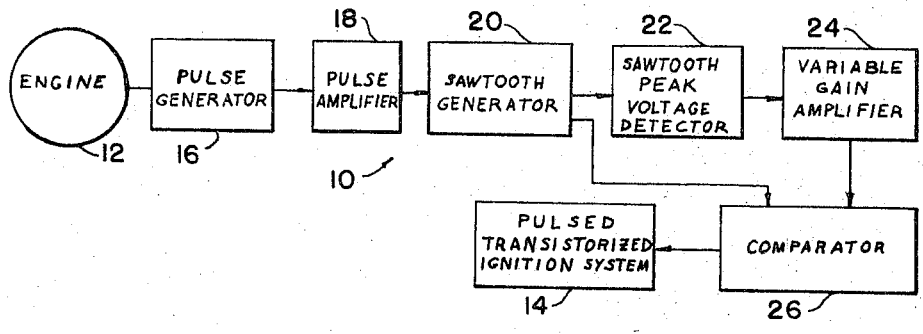
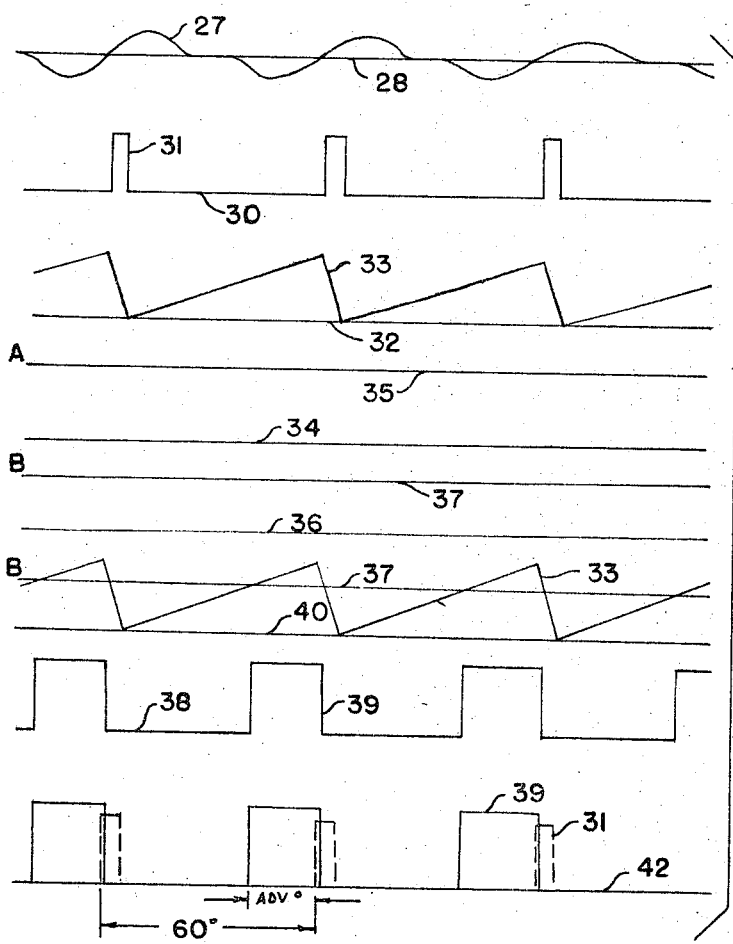
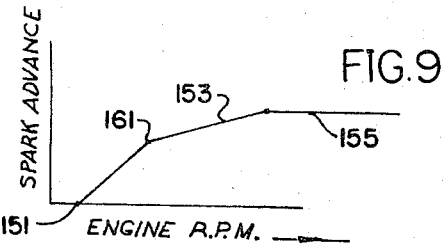
INVENTOR.
ALFRED SCHNEIDER
BY Whittemore
Hulbert & Belknap
ATTORNEYS April 18, 1967     A. SCHNEIDER     3,314,407
ELECTRONIC ADVANCE FOR ENGINE IGNITION SYSTEMS
Filed Sept. 28, 1964     3 Sheets-Sheet 2
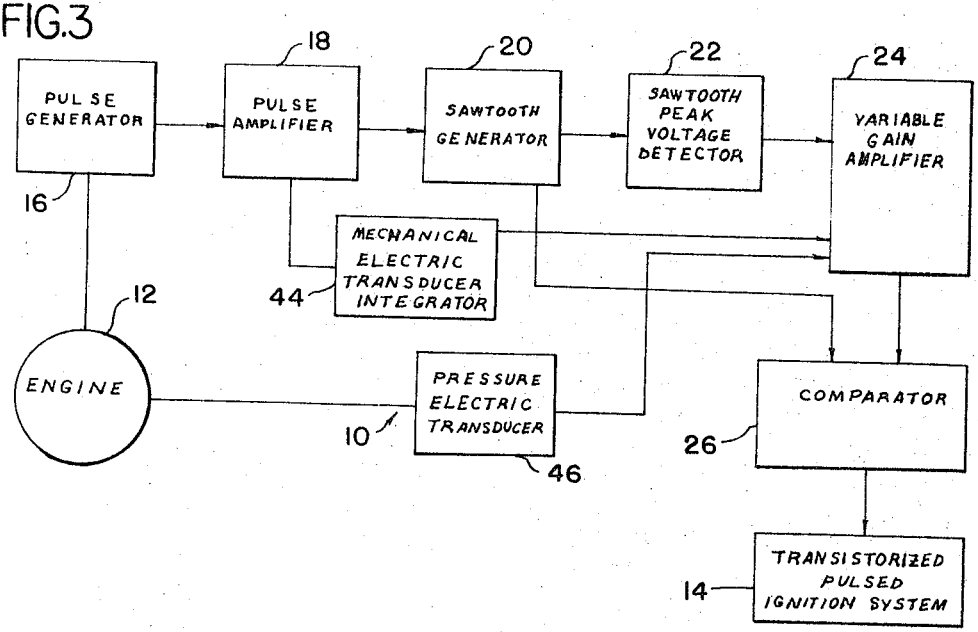
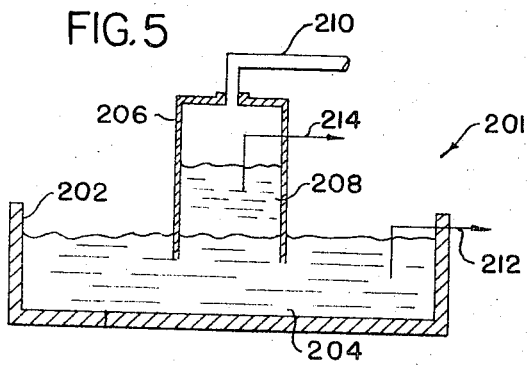
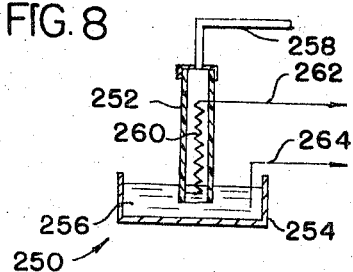
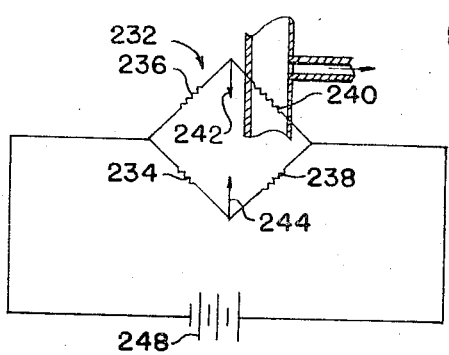
INVENTOR.
ALFRED SCHNEIDER
BY *Whittemore*
*Hulbert & Belknap*
ATTORNEYS

United States Patent Office 3,314,407
Patented Apr. 18, 1967

3,314,407
ELECTRONIC ADVANCE FOR ENGINE IGNITION SYSTEMS
Alfred Schneider, Detroit, Mich., assignor to Holley Carburetor Company, Warren, Mich., a corporation of Michigan
Filed Sept. 28, 1964, Ser. No. 399,566
25 Claims. (Cl. 123—148)

The invention relates to ignition systems and refers more specifically to electronic spark advance structure for use in conjunction with transistorized pulsed internal combustion engine ignition systems or the like.

In the usual electro-mechanical ignition systems for internal combustion engines and the like, spark advance in accordance with predetermined engine parameters is accomplished by a plurality of electro-mechanical devices. Thus spark advance in accordance with engine speed is often accomplished by centrifugal weight mechanisms effective to rotate a distributor cam, while spark advance in accordance with engine manifold or venturi vacuum is accomplished through the use of a pressure responsive diaphragm. Such electro-mechanical devices are subject to error due to mechanical wear, hysteresis, dirt and the like.

While completely electronic ignition circuits, such as the transistorized pulsed ignition circuit disclosed in commonly owned patent application, Ser. No. 336,418, filed Jan. 8, 1964, are not subject to the above indicated sources of error, the spark advance structure used therewith in the past have either been electro-mechanical and therefore subject to the above sources of error or have been so complicated as to be prohibitive for the usual automotive and industrial applications of internal combustion engines.

It is therefore an object of the present invention to provide improved spark advance structure.

Another object is to provide electronic spark advance structure for use in conjunction with pulsed ignition systems.

Another object is to provide spark advance structure for use with internal combustion engines having transistorized pulsed ignition systems including means for generating a monotonic electric signal the frequency of which is in accordance with desired ignition spark frequency as determined by engine speed, means for providing a reference signal having the value of the peak value of the monotonic signal, means for varying the reference signal in accordance with at least one engine parameter to provide a signal reduced in absolute value, means for comparing the monotonic signal and the reduced reference signal during each cycle of the monotonic signal operable to provide a trigger signal for triggering a transistorized pulsed ignition system when the monotonic signal and reduced reference signal have a predetermined value relation.

Another object is to provide electronic spark advance structure as set forth above and further including means for selecting a value of an engine parameter at which spark advance is initiated.

Another object is to provide electronic spark advance structure as set forth above and further including means for selecting the rate of spark advance with respect to engine parameter increase after spark advance is initiated.

Another object is to provide electronic spark advance structure as set forth above and further including means for selecting a value of an engine parameter at which a different rate of spark advance is initiated.

Another object is to provide electronic spark advance structure as set forth above and further including means for selecting the different rate of spark advance.

Another object is to provide electronic spark advance structure as set forth above wherein the engine parameter is engine speed and the means for varying the reference signal in accordance with an engine parameter comprises a variable gain amplifier wherein the gain is controlled in accordance with engine speed sensed by a mechanical-electric transducer.

Another object is to provide electronic spark advance structure as set forth above wherein the mechanical-electric transducer comprises an electromagnetic pick-up probe for producing electric pulses at a frequency proportional to engine speed and an integrating circuit connected to the pick-up probe.

Another object is to provide electronic spark advance structure as set forth above wherein the engine parameter is engine vacuum and the means for varying the reference signal in accordance with an engine parameter comprises a variable gain amplifier wherein the gain is controlled in accordance with engine speed sensed by a pressure-electric transducer.

Another object is to provide a pressure-electric transducer comprising a container of relatively heavy fluid which is an electric conductor, a tube of relatively light fluid which is an electric conductor having different conducting properties than the heavy fluid positioned above and in open communication with the relatively heavy fluid in the container, the top of which is connected to a variable pressure and electric conductors extending into the fluid in the pan and in the tube in a fixed position.

Another object is to provide a pressure-electric transducer comprising a vacuum meter including a light shield movable in accordance with vacuum applied thereto, a light on one side of the light shield and a light sensitive resistor or photo-cell or photo-transistor on the other side of said light shield.

Another object is to provide a pressure-electric transducer comprising a resistance bridge circuit one branch of which is a thermistor or other temperature sensitive element positioned in a pressure responsive cooling air flow and means for providing an electric signal across the bridge circuit.

Another object is to provide electronic spark advance structure for retro-fitting existing pulsed ignition systems.

Another object is to provide electronic spark advance structure which is simple in construction, economical to manufacture and efficient in use.

Other objects and features of the invention become apparent as the description proceeds, especially when taken in conjunction with the accompanying drawings, illustrating a preferred embodiment of the invention, wherein:

FIGURE 1 is a block diagram of electronic spark advance structure constructed in accordance with the invention.

FIGURE 2 is a plurality of graphs of the electric signals at different points in the electronic spark advance structure illustrated in FIGURE 1.

FIGURE 3 is a block diagram of electronic spark advance structure as illustrated in FIGURE 1 and including engine speed and vacuum spark advance means.

FIGURE 5 is a diagrammatic representation of a pressure-electric transducer for use in electronic spark advance structure as illustrated in FIGURE 3.

FIGURE 6 is a diagrammatic representation of another pressure-electric transducer for use in electronic spark advance structure as illustrated in FIGURE 3.

FIGURE 7 is a diagrammatic representation of still another pressure-electric transducer for use in electronic spark advance structure as illustrated in FIGURE 3.

FIGURE 8 is a diagrammatic representation of a further pressure-electric transducer for use in electronic spark advance structure as illustrated in FIGURE 3.

FIGURE 9 is a graph plotting engine speed against spark advance which may be produced with electric spark advance structure as illustrated in FIGURE 4.

Figure 4:
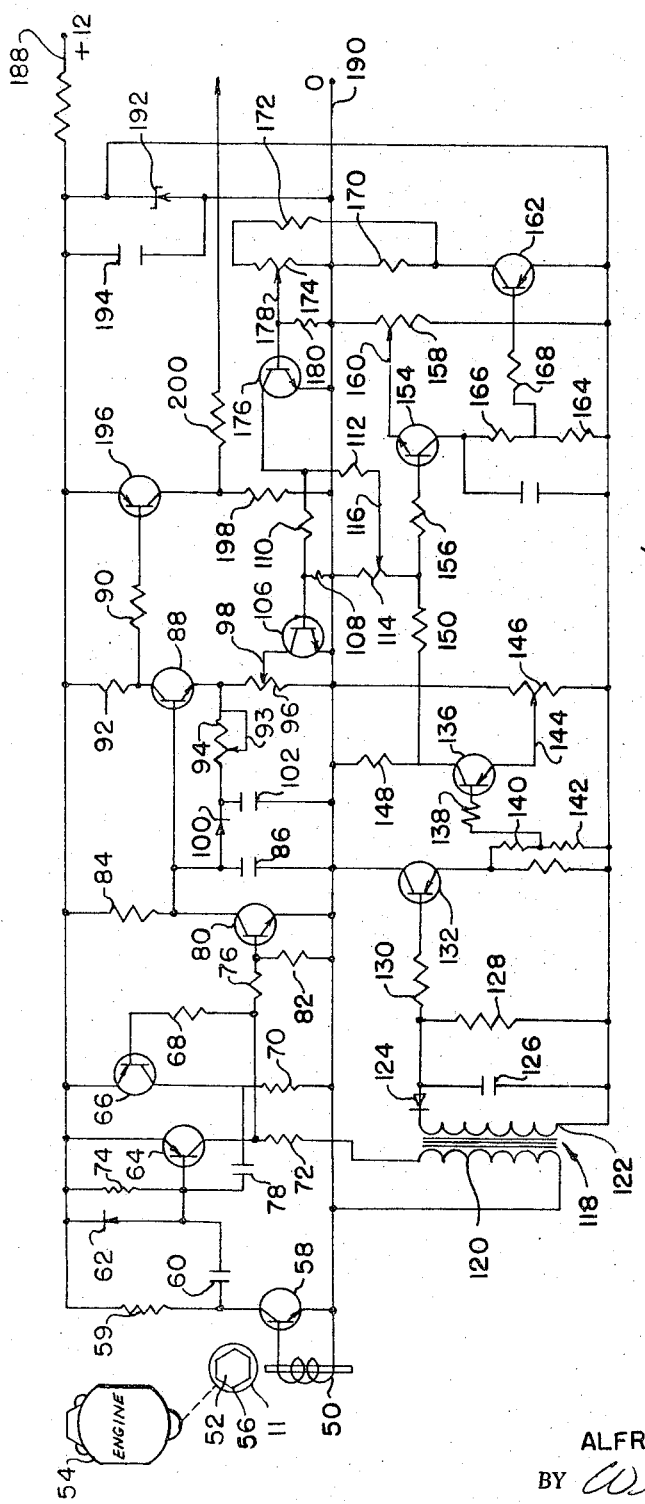
FIGURE 4 is a schematic diagram of one embodiment of electronic spark advance structure as illustrated in FIGURES 1 and 3.

With particular reference to the figures of the drawings, one embodiment of the present invention will now be considered in detail.

As shown in FIGURE 1 the electronic spark advance structure 10 is positioned between the internal combustion engine 12 and the transistorized pulsed ignition system 14. The electronic spark advance structure includes the pulse generator 16, pulse amplifier 18, sawtooth generator 20, sawtooth peak voltage detector 22, variable gain amplifier 24 and comparator 26.

In operation, pulses at a frequency proportional to engine speed and synchronized with the operating cycle of the engine are developed by the pulse generator 16 and are amplified in pulse amplifier 18. The amplified pulses from pulse amplifier 18 are used to produce a corresponding monotonic electric signal in sawtooth generator 20 which is fed to the comparator 26. Sawtooth peak voltage detector 22 detects the peak voltage of the monotonic electric signal and feeds the peak voltage to the variable gain amplifier 24 the gain of which is less than one and may be determined in accordance with variable engine parameters. The signals from the variable gain amplifiers and the sawtooth generator 20 are compared in the comparator 26 which accordingly provides an output to the transistorized pulsed ignition system 14 at a time synchronized with the engine 12 and which is advanced with respect to the engine cycle of operation in accordance with the gain of the amplifier 24.

More specifically the engine 12 is a six cylinder internal combustion engine. The distributor 11 associated with engine 12 includes a distributor cam 52 which rotates at a speed proportional to engine speed and is synchronized therewith on operation of engine 12.

The pulse generator 16 may be an electromagnetic probe 50 positioned adjacent the cam 52 of the distributor 11 to provide an output voltage signal 27, as shown on line 28 of FIGURE 2 having positive and negative going portions recurring at a frequency determined by engine speed as indicated by the lobes 56 of the distributor cam passing close to the probe 50. Electromagnetic pulse generator structures are not new. In this regard reference is made to the previously cited commonly owned patent application Ser. No. 336,418 and the other copending applications referenced therein.

The pulse amplifier 18 may be for example a multivibrator operable to provide square wave voltage signals 31, as shown on line 30 of FIGURE 2. The square wave signals illustrated on line 30 have a repetition frequency determined by the sixty degree separation of the lobes of the distributor cam 52 in the case of a six cylinder engine 54 and the engine speed. The pulse amplifier multivibrator 18 is triggered by the differentiated positive portion of the pulse generator signal 27 to produce the square wave voltage signals 31 which are of a duration that is short as compared to the pulse repetition time.

The sawtooth generator 20 may be a pulsed amplifier having a capacitor connected thereacross or any other known sawtooth generator circuit operable to produce a cyclic monotonic signal synchronized with the pulses from the pulse amplifier 18. The sawtooth voltage signal 33 from sawtooth generator 20 illustrated on line 32 has a voltage value peak designation A. Thus the sawtooth peak voltage detector 22 which may be an integrating circuit will have a maximum value of A volts, as indicated by voltage signal 35 with respect to line 34 in FIGURE 2.

The variable gain amplifier 24 is chosen to have a gain which is less than or equal to one so that the voltage signal output 37 therefrom, as shown with respect to line 36 of FIGURE 2, will be some value B less than the peak value A of the signal from sawtooth generaor 20.

The comparator 26 is a simple voltage comparator many of which are well known and which is operative to produce an output voltage signal 39, as indicated on line 38 of FIGURE 2, when the voltage signal 33 exceeds voltage signal 37, as indicated with respect to line 40 in FIGURE 2.

With reference to line 42 of FIGURE 2, it will therefore be seen that the initiation of the output of the comparator 26 and therefore the pulsing of the transistorized ignition system 14 may be varied in time with relation to the position of the lobes of the distributor cam of the engine 12 in accordance with the gain of the variable gain amplifier 24. In terms of engine cycle degree spark advance this relationship may be expressed by the formula:

$$(1) \quad \text{Advance} = \left(1 - \frac{B}{A}\right) \cdot 60°$$

wherein advance equals the spark advance for the engine 12 (in cam degrees) provided by the spark advance structure 10 through the transistorized pulsed ignition system 14 when the engine 12 has six cylinders. If the engine 12 has eight cylinders so that the distributor cam has eight lobes, the sixty degree figure must be changed to a forty-five degree figure.

Further it will be noted that the term $B/A$ is the gain of the variable gain amplifier 24 which always has a gain of less than one so that with respect to eight cylinder engines, the formula given above would be $$(2) \quad \text{Advance} = (1 - \text{Gain}) \cdot 45°$$

The monotonic function indicated by line 33 in FIGURE 2 is in the general case $f(t)$. Since this function is simply increasing or decreasing its inverse exists and the following general equation similar to Equations 1 and 2 is true.

$$(3) \quad \text{Advance} = \left[1 - \frac{f(t)^{-1}(\text{gain} \cdot A)}{f(t)^{-1} \cdot A}\right] \cdot 45°$$

Where A is the voltage reached in monotonic fashion after time $t$, $t$ is sixty divided by the revolutions per minute times the number of cylinders in the engine and $f(t)$ is a monotonic function. For a six cylinder engine again the 45° would be changed to 60°.

Thus varying the gain of the amplifier 24 in accordance with predetermined parameters will provide electronic spark advance for the engine 12 having a pulsed ignition system 14 in accordance with the selected parameters. As shown in FIGURE 3, structure 44 is provided in conjunction with the spark advance structure 10 to advance the spark provided engine 12 by the transistorized pulsed ignition system 14 in accordance with the speed of the engine 12. The structure 46 is similarly provided to vary the gain of amplifier 24 in accordance with vacuum produced by engine 12 to vary the spark advance provided the engine 12 by the transistorized pulsed ignition system 14 in accordance with engine vacuum. Engine vacuum may be for example engine manifold or venturi vacuum or a combination of these or other engine vacuums.

Other engine parameters may if desired be used to vary the gain of amplifier 24 and thus the spark advance provided engine 12 by the transistorized pulsed ignition system 14. Further the signal through the variable gain amplifier 24 may be varied to determine the time of initiation of spark advance with respect to engine parameters such as engine speed for example, the rate of spark advance relative to rate of parameter change over the entire range of speed of engine 12 and engine parameters at which the rate of spark advance relative to rate of parameter change is changed.

Thus, as shown in FIGURE 4, electronic spark advance structure 48 includes means for determining the time of initiation of spark advance with respect to engine speed and the increase in spark advance with increasing engine speed after initiation of spark advance. Also, with the electronic spark advance structure 48 of FIGURE 4, an engine speed at which it is desired to change the rate of increase of spark advance with increasing engine speed may be selected as well as the changed rate of increase of spark advance with increasing engine speed.

Specifically the electronic spark advance structure 48 includes the electromagnetic pick-up probe 50 positioned adjacent the cam 52 of distributor 11 driven by engine 54 to generate electric pulses as the lobes 56 of cam 52 are rotated thereby. The pulses from pulse generator probe produce a voltage signal similar to that illustrated on line 28 in FIGURE 2. This signal is amplified through transistor 58 across resistor 59.

The signal through transistor 58 is differentiated through capacitor 60 in conjunction with rectifier 62 and resistor 74 to provide a trigger signal to the pulse amplifier multivibrator including transistors 64 and 66 and their associated resistors 68, 70, 72 and capacitor 78. The output signal of the multivibrator appears as signal 31 in line 30 of FIGURE 2 and is fed to the sawtooth generator including transistor 80 and resistors 82 and 84 and capacitor 86.

The sawtooth signal from the sawtooth generator, as illustrated on line 32 of FIGURE 2, is fed to the comparator including transistor 88 and associated resistors 92 and 94 and variable resistor 96 having the wiper arm 98 in conjunction therewith. In addition the sawtooth voltage signal 33 of FIGURE 2 is applied across rectifier 100 to capacitor 102 where it is integrated in conjunction with resistors 94 and 96 to provide a signal equal to the sawtooth peak voltage, signal 35 in FIGURE 2, to the top of the variable resistor 96 operable in conjunction with the variable gain amplifier 106 connected thereto through the wiper arm 98 engaged with the variable resistance 96.

The voltage applied to the comparator 26 from the sawtooth peak voltage detector is regulated in accordance with the gain of the variable gain amplifier including the transistor 106 and the biasing circuit therefor including the resistors 108, 110 and 112 in conjunction with the variable resistor 114 and wiper arm 116. The gain of the variable gain amplifier 24 in the electronic spark advance structure 48 is determined in accordance with engine speed.

Thus the output signal of the pulsed amplifier 18 is also fed through the transformer 118 including primary winding 120 and secondary winding 122 to produce a pulsed signal in the secondary winding 122 similar to signal 31 on line 30 of FIGURE 2. This pulsed signal is integrated through rectifier 124 and capacitor 126 in conjunction with resistor 128 and is applied through resistor 130 to transistor amplifier 132.

A portion of the signal from amplifier 132 is applied to transistor amplifier 136 over resistors 138, 140 and 142. Amplifier 136 conducts when the speed of the engine 54 is such that the integrated signal through amplifier 132 provides a predetermined bias on amplifier 136 with the wiper arm 144 in a predetermined position on variable resistance 146. The signal through amplifier 136 across resistor 148 is fed to resistance 114 through resistor 150 to vary the bias applied over resistors 112 and 110 to the variable gain amplifier 106 whereby the signal B on line 36 of FIGURE 2 is initiated with the initiation of conductance of amplifier 136.

Thus referring to FIGURE 9 the speed of the engine 54 at which spark advance is initiated, as indicated at 151, is determined by the setting of the wiper arm 144 on resistor 146. The initial rate of spark advance with respect to increase in speed of engine 54 as indicated by the initial slope of line 153 of FIGURE 9 is determined by the setting of the wiper arm 116 on variable resistor 114.

In addition the signal from amplifier 136 is fed to transistor amplifier 154 over resistor 156. The amplifier 154 will conduct when the signal from amplifier 136 as compared to the signal provided to the amplifier 154 over variable resistor 158 through wiper arm 160 provides the required bias for the amplifier 154.

Conduction of the amplifier 154 causes the transistor amplifier 162 to conduct in accordance with the signal through resistors 164 and 166 fed thereto over the resistor 168. The signal from amplifier 162 across resistor 170 is fed through resistors 172 and 174 to the amplifier 176 over wiper arm 178 of variable resistor 174 across resistor 180.

Thus the bias applied to the variable gain amplifier 106 is again changed in accordance with the conductance of amplifier 176 at some predetermined engine speed selectable by the position of the wiper arm 160. The rate of change of spark advance relative to rate of change of engine speed at the predetermined engine speed is indicated by the portion of the line 153 to the left of the predetermined engine speed selected by positioning wiper arm 160, as indicated by point 161 on line 153. An ultimate advance limit stop at which no further spark advance will occur regardless of engine speed is indicated by portion 155 of line 153 starting at point 171 selected by positioning the wiper arm 93 of resistor 94.

The input electric energy to the electronic spark advance structure 48 is provided over conductors 188 and 190 across which the regulating Zener diode 192 and the filter capacitor 194 are placed in parallel. The input electric energy may be supplied by the usual twelve volt automobile battery.

The output of the transistor 88 over resistor 92 is as shown on line 38 of FIGURE 2 as a square wave in which the leading edge is positioned to provide a spark advance in engine cycle degrees as shown on line 42 in FIGURE 2, in accordance with the formulae indicated above.

In the spark advance structure 48 illustrated in FIGURE 4 the output of the transistor 88 is first fed through resistor 90 to an inverter transistor 196 before the resultant voltage dropped across resistor 198 is fed to the transistorized pulsed ignition system 14 over resistor 200. The inverter 196 is provided to permit use of the transistorized spark advance structure 48 with the transistorized pulsed ignition system illustrated in the above referenced copending patent application Ser. No. 336,418.

As previously indicated the electronic spark advance structure of the invention may be used to advance the ignition spark applied to an engine in accordance with engine vacuum as well as in accordance with engine speed and other variable parameters. To vary the gain of variable gain amplifier 24 in accordance with engine vacuum a transducer to convert between pressure and electric energy is necessary after which variations in electric energy may be used to vary the gain of the variable gain transistorized amplifier in a known manner, as for example as shown in FIGURE 4. Pressure-electric transducers for accomplishing conversion of a variable engine vacuum to a variable electric signal are illustarted in FIGURES 5–8.

In FIGURE 5 the pressure-electric transducer 201 includes a container 202 having a relatively heavy electricity conducting liquid 204, such as mercury, therein. A tube 206 containing a relatively light electricity conducting fluid 208 therein and having an open bottom is inserted in the liquid 204. The tube 206 is connected to the engine vacuum in accordance with which ignition spark is to be advanced by the vacuum conduit 210 and the electrical conductors 212 and 214 are placed in the liquids 204 and 208 in fixed position, as shown.

Because of the different electric conductivity of the liquids 204 and 208 the electric resistance between the electrical conductors 212 and 214 connected in an electric circuit as, for example, the circuit of the variable gain amplifier 24 will vary in accordance with the height of the liquid 204 in tube 206 which varies in accordance with engine vacuum to provide the desired pressure-electric conversion.

In the pressure-electric transducer 215 of FIGURE 6 the light sensitive element 216 which may be a resistor, photo-cell, photo-diode, photo-transistor or the like is provided on one side of a light shield 218 connected to the movable element 220 of a vacum meter for movement in accordance with engine vacuum applied to the meter and the light 226 is provided on the other side of the light shield 218. Thus in operation as engine vacuum is applied to the vacuum meter 224 the light shield 218 will shield progressively more light from light sensitive element 216 to vary the electric resistance between the conductors 228 and 230 to provide the required control of variable gain amplifier 24. In conjunction with certain light sensitive elements the shield could of course shield progressively less light from the light sensitive element with the same result of varying the electric resistance between the condutcors 228 and 230.

As shown in FIGURE 7 the pressure-electric transducer 231 comprises an electric bridge circuit 232 including resistors 234 and 238 therein in conjunction with the temperature sensitive elements 236 and 240 which may be thermistors, diodes, transistors, sensistors or the like element 240 of which is positioned to receive air drawn thereacross in accordance with engine vacuum with which it is desired to regulate the spark advance. The effect of the air flow across resistor 240 is then to vary the output of the bridge across conductors 242 and 244 in accordance with engine vacuum when electric energy is applied to the bridge circuit 232 from electric energy source 248. Having both the elements 236 and 240 temperature sensitive provides temperature compensation for the bridge 232. The pressure-electric transducer 231 will function without temperature compensation if element 236 is a resistor which is not temperature sensitive.

The pressure-electric transducer 250 of FIGURE 8 comprises an insulating tube 252 the lower, open end of which is suspended in the container 254 having the conducting fluid 256 which may be mercury therein and the upper end of which is connected through conduit 258 to a source of pressure, such as engine vacuum. A resistor 260 is suspended in tube 252 so that the resistance offered thereby between conductors 262 and 264 is gradually reduced by the fluid 256 shorting out longer lengths of resistor 260 as the fluid rises in the tube 252.

While one embodiment of the present invention and modifications thereof have been considered in detail, it will be understood that other embodiments and modifications of the present invention are contemplated. Thus while the electronic ignition spark advance structure of the invention has been described in conjunction with a transistorized pulsed ignition circuit, as disclosed in copending patent application Ser. No. 336,518, it will be understood that the electronic spark advance structure of the invention may be modified to function as a retrofitted spark advance system on any pulsed ignition circuit requiring spark advance proportional to variable parameters and may be applied as initial equipment with pulsed ignition systems. It is the intention to include all embodiments and modifications of the disclosed invention as are defined by the appended claims within the scope of the invention.

What I claim as my invention is:

1. In conjunction with an engine, a pulsed ignition system for supplying ignition spark to the engine and electronic spark advance structure connected to the ignition system for advancing the ignition spark supplied to the engine by the ignition system responsive to an engine parameter and including means for initiating spark advance only after the parameter is above a selectable predetermined value and further including means for selecting the rate of spark advance relative to rate of parameter increase when spark advance is initiated and thereafter.

2. Structure as set forth in claim 1 wherein the spark advance structure further includes means for selecting a second rate of spark advance relative to rate of parameter increase at parameter values above a second predetermined parameter value.

3. Structure as set forth in claim 2 wherein said electronic spark advance structure further includes means to select the second predetermined parameter value.

4. In conjunction with an engine, a pulsed ignition system for supplying ignition spark to the engine and electronic spark advance structure connected to the ignition system for advancing the ignition spark supplied to the engine by the ignition system responsive to an engine parameter including means for initiating spark advance only after the parameter is above a selectable predetermined value and for selecting the rate of spark advance relative to rate of parameter increase after spark advance is initiated and further including means for selecting parameter values above the value at which spark advance is initiated at which the rate of spark advance relative to the rate of parameter change is changed and means for selecting the changed rate of spark advance for the selected parameter values relative to the rate of parameter change.

5. Structure as set forth in claim 4 wherein said electronic spark advance structure further includes means for selecting a parameter value at which no further spark advance occurs with an increase in parameter value.

6. An internal combustion engine, a pulsed semi-conductor ignition system connected to the engine for providing ignition spark to the engine in accordance with the cyclical operation of the engine and electronic spark advance structure connected between the engine and pulsed semi-conductor ignition system and responsive to at least one engine parameter to provide ignition spark advance in accordance with variation of the engine parameter including means for generating a sawtooth monotonic electric signal at a frequency determined by the speed of the engine, sawtooth peak voltage detector means for generating a reference signal having the value of the peak value of the monotonic signal, means for reducing the reference signal in accordance with at least one engine parameter comprising a variable gain amplifier receiving the signal from the sawtooth peak voltage detector and having a gain characteristic of less than or equal to one and means for comparing the monotonic signal and the reduced reference signal responsive to a reversal of the relative values of the monotonic signal and the reduced reference signal to provide a spark advance output signal to the pulsed ignition system.

7. Structure as set forth in claim 6 wherein the comparator comprises an amplifying transistor, means for applying the sawtooth signal to the base of the transistor and means for applying the output signal of the variable gain amplifier to the emitter of the transistor to provide a bias on the transistor which produces an output signal therefrom when the sawtooth signal is greater than the reference signal.

8. Structure as set forth in claim 6 and further including means responsive to engine vacuum for varying the gain of the variable gain amplifier.

9. Structure as set forth in claim 8 wherein the means responsive to engine vacuum for varying the gain of the variable gain amplifier comprises a vacuum responsive resistor in the variable gain amplifier circuit and a pressure-electric transducer connected to engine vacuum and to said resistor for varying the value of the resistor in the variable gain amplifier circuit.

10. Structure as set forth in claim 9 wherein the pressure-electric transducer comprises a container of heavy liquid of one electric conductivity, a tube of light liquid of a second electric conductivity having an open bottom inserted within the heavy liquid, means for connecting the upper end of the tube to engine vacuum, an electrode inserted in the liquid in the tube in a fixed position and a separate electrode inserted within the liquid in the container in a fixed position.

11. Structure as set forth in claim 6 and further including means responsive to engine speed for varying the gain of the variable gain amplifier.

12. Structure as set forth in claim 11 wherein the means responsive to engine speed for varying the gain of the variable gain amplifier comprises a resistor in the variable gain amplifier circuit and a mechanical-electric-transducer including means for producing electric pulses in accordance with engine speed, means for integrating the pulses and means for applying the integrated pulsed signal to the variable gain amplifier to vary the bias thereon.

13. Structure as set forth in claim 6 and further including means for varying the gain of the variable gain amplifier only after the engine parameter exceeds a predetermined engine parameter.

14. Structure as set forth in claim 13 and further including means for selecting the engine parameter at which the gain of the variable gain amplifier will be changed.

15. Structure as set forth in claim 14 and further including means for varying the rate of change of gain of the variable gain amplifier with relation to the rate of change of engine parameter value at engine parameter values above the predetermined engine parameter value.

16. Structure as set forth in claim 15 wherein said electronic spark advance structure further includes means for selecting a parameter value at which no further spark advance occurs with an increase in parameter value.

17. Spark advance structure comprising means for generating a monotonic periodic signal, means for producing a peak signal having a value equal to the peak value of the monotonic periodic signal, means for reducing the peak signal in accordance with a parameter with which it is desired to advance a spark, means for comparing the monotonic wave and the reduced signal and for producing a spark advance signal when the value of the monotonic signal is greater than the value of the reduced signal.

18. Structure as set forth in claim 17 and further including means for varying the value of the parameter at which spark advance is initiated.

19. Structure as set forth in claim 18 and further including means for selecting a first ratio of spark advance to parameter value after initiation of spark advance.

20. Structure as set forth in claim 19 and further including second means for selecting a predetermined parameter value at which the ratio of parameter value to spark advance is changed.

21. Structure as set forth in claim 20 and further including means for selecting the changed ratio of spark advance to parameter value.

22. Structure as set forth in claim 21 wherein said electronic spark advance structure further includes means for selecting a parameter value at which no further spark advance occurs with an increase in parameter value.

23. Spark advance structure comprising means for generating a monotonic periodic signal, means for producing a peak signal having a value equal to the peak value of the monotonic periodic signal, means for reducing the peak signal in accordance with a parameter with which it is desired to advance a spark, means for comparing the monotonic wave and the reduced signal and for producing a spark advance signal when a specific difference in value exists between the monotonic signal and the reduced signal.

24. An internal combustion engine, a distributor having a distributor cam operably associated with said engine, a pulsed semi-conductor ignition system connected to the engine for providing ignition spark to the engine in accordance with the cyclical operation of the engine and an electronic spark advance structure connected between the engine and semi-conductor ignition system and responsive to at least one engine parameter to provide ignition spark advance in accordance with variation of the engine parameter including means for generating a monotonic electric signal at a frequency determined by the speed of the engine comprising a pulse generator operably associated with the distributor cam for producing electric pulses in accordance with the rotation of the distributor cam, a pulse amplifier for amplifying the electric pulses from the pulse generator and a sawtooth generator for producing a sawtooth electric signal in response to the electric pulses from the pulse amplifier, means for generating a reference signal having the value of the peak value of the monotonic signal comprising a sawtooth peak voltage detector connected to the sawtooth generator for integrating the sawtooth signal provided by the sawtooth generator, means for reducing the reference signal in accordance with at least one engine parameter comprising a variable gain amplifier receiving the integrated signal from the sawtooth peak voltage detector and having a gain characteristic of less than or equal to one and means for comparing the monotonic signal and the reduced reference signal responsive to a reversal of the relative values of the monotonic signal and the reduced reference signal to provide a spark advance output signal to the pulsed ignition system.

25. An internal combustion engine, a distributor associated with the internal combustion engine, a pulsed semi-conductor ignition system connected to the engine for providing ignition spark to the engine in accordance with the cyclical operation of the engine and electronic spark advance structure connected between the engine and pulsed semi-conductor ignition system and responsive to at least one engine parameter to provide ignition spark advance in accordance with variation of the engine parameter including means for generating a monotonic electric signal at a frequency determined by the speed of the engine including a pulse generator for producing electric pulses in accordance with the speed of the engine, a pulse amplifier for amplifying the electric pulses from the pulse generator and a sawtooth generator for producing a sawtooth monotonic electric signal in response to the electric pulses of the pulse amplifier, means for generating a reference signal having the value of the peak value of the monotonic signal, means for reducing the reference signal in accordance with at least one engine parameter and means for comparing the monotonic signal and the reduced reference signal responsive to a reversal of the relative values of the monotonic signal and the reduced reference signal to provide a spark advance output signal to the pulsed ignition system.

References Cited by the Examiner

UNITED STATES PATENTS

| | | | |
|---|---|---|---|
| 2,785,215 | 3/1957 | Yetter | 123—148 |
| 2,852,590 | 9/1958 | Fremon. | |
| 2,943,614 | 7/1960 | Bosch et al. | |
| 3,005,447 | 10/1961 | Baumann et al. | |
| 3,060,346 | 10/1962 | Sohner | 123—148 X |
| 3,103,821 | 9/1963 | Wright | 73—398 |
| 3,202,146 | 8/1965 | Short et al. | 123—148 |

MARK NEWMAN, *Primary Examiner.*

LAURENCE M. GOODRIDGE, *Examiner.*